United States Patent [19]

Blakeslee

[11] 4,249,283
[45] Feb. 10, 1981

[54] METHOD AND APPARATUS FOR EXTRACTING CLAM BELLIES

[75] Inventor: Gerald A. Blakeslee, Milton, Del.

[73] Assignee: William J. Lawson, Milton, Del.

[21] Appl. No.: 59,742

[22] Filed: Jul. 23, 1979

[51] Int. Cl.³ .......................................... A22C 29/04
[52] U.S. Cl. .......................................... 17/51; 17/53
[58] Field of Search .................. 17/53, 51, 46, 48, 72, 17/73

[56] References Cited

U.S. PATENT DOCUMENTS

| | | | |
|---|---|---|---|
| 2,808,612 | 10/1957 | Snow | 17/53 |
| 3,421,620 | 1/1969 | Lapeyre | 17/53 X |
| 3,688,344 | 9/1972 | Carlson | 17/53 |
| 3,722,035 | 3/1973 | Hanks | 17/51 X |
| 3,789,457 | 2/1974 | Snow | 17/53 X |
| 3,890,676 | 6/1975 | Snow | 17/53 X |
| 3,964,131 | 6/1976 | Snow | 17/53 |
| 4,148,112 | 4/1979 | Marvin | 17/53 |

*Primary Examiner*—Willie G. Abercrombie
*Attorney, Agent, or Firm*—B. P. Fishburne, Jr.

[57] ABSTRACT

Shucked whole clams are drawn by suction through a delivery tube having multiple bulbous portions and intervening constrictions. In passing through the delivery tube, the clams are subjected to repetitive massage or squeezing followed by sudden release from each constriction into a bulbous zone where the clam is suddenly decelerated prior to entering the next constriction in the delivery tube. The clams with their bellies essentially separated from the remainder of the meat are discharged from one end of the delivery tube into a primary suction chamber and are then propelled through a flush pipe under influence of two converging fluid jet streams somewhat downstream from the delivery tube which exert a further squeezing pressure on each clam while propelling it through the flush pipe and maintaining the required degree of suction in the system. At the far end of the flush pipe, the product exits through a gently curved reversely directed and flared decelerator onto a separating conveyor from which the bellies and usable meat are collected in two different receptacles. The process is gentle and substantially eliminates damage to the meat.

17 Claims, 4 Drawing Figures

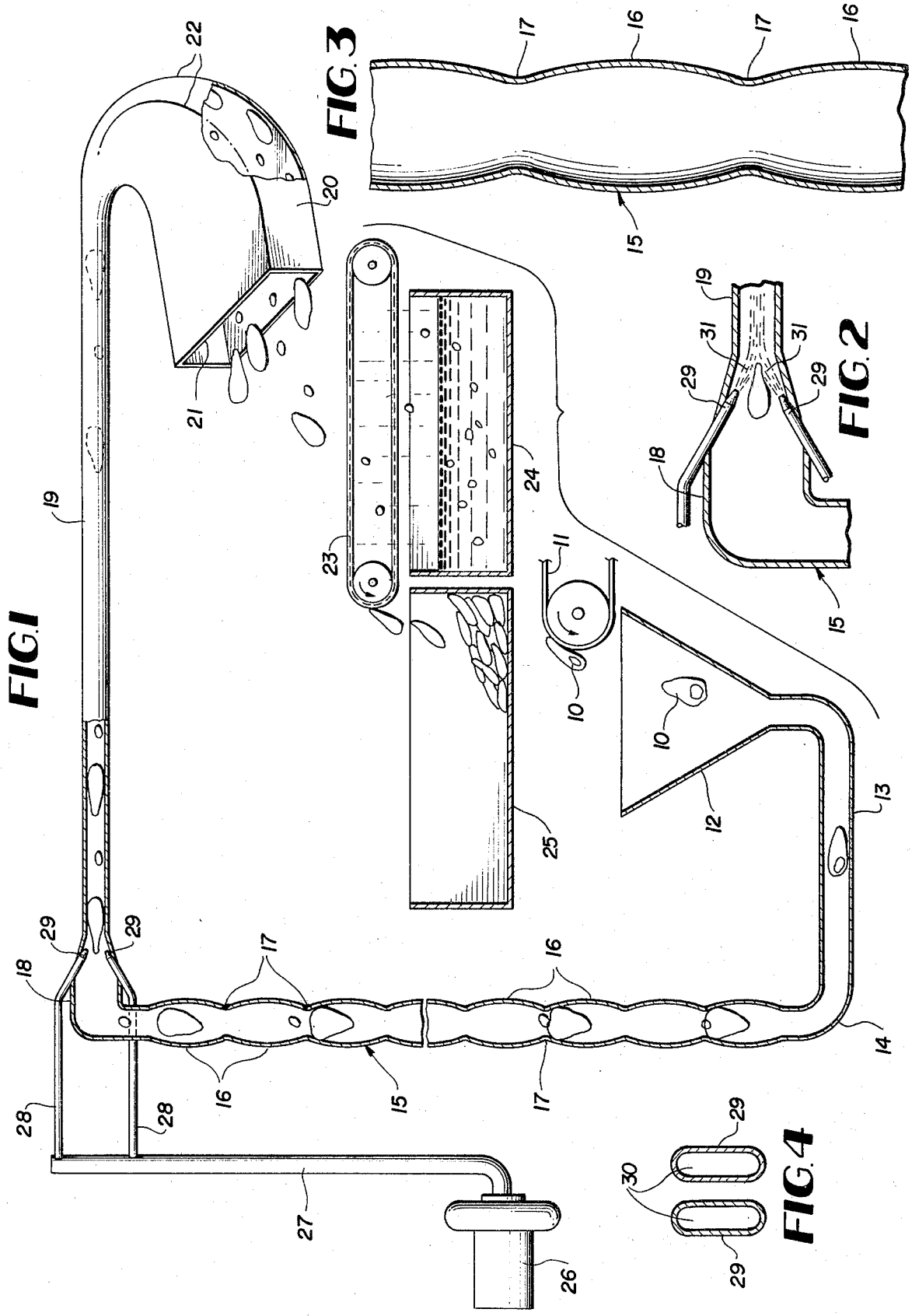

METHOD AND APPARATUS FOR EXTRACTING CLAM BELLIES

BACKGROUND OF THE INVENTION

The present invention is embodied in a method of and apparatus for extracting the "belly" of a marine mollusk, such as a clam, from the remainder of the clam meat after the clam has been shucked. The commercial necessity for de-bellying clams is thoroughly discussed in a number of prior United States patents, including the following patents which are made of record herein under 37 C.F.R. 1.56: U.S. Pat. Nos.:

| | |
|---|---|
| 3,659,315 | 3,890,676 |
| 3,688,344 | 3,964,131 |
| 3,789,457 | 4,148,112 |

In the patented and commercial prior art, clam bellies are removed by a variety of methods which result in varying degrees of damage to the usable meat causing it to lose some of its firmness and weight. Frequently, the clam bellies are separated from the meat by hand using physical pressure. A steam injection method of extraction is known in the prior art as well as a mechanical beating method. It is also known to soak and agitate the mollusks in tanks to loosen the bellies for easier separation by hand or by other prior art methods. All of these belly extracting processes result in serious damage to the usable clam meat and are outmoded and unacceptable under present-day commercial standards.

One fairly recent method of extracting clam bellies is disclosed in U.S. Pat. No. 3,688,344 to Carlson. This method essentially involves impacting whole clams at high velocity against a stationary screen panel which allows the bellies to pass through the screen and to be separated from the remainder of the clam body which is arrested in its movement by the screen. While the method is quite effective in separating the bellies from the clam meat, the meat is damaged in terms of loss of firmness and weight due to the escape of certain juices from the tissue.

In a more recent prior art method disclosed in U.S. Pat. No. 4,148,112 to Marvin, shucked whole clams are delivered by suction through a pipe or tube into a fluid shearing zone where the whole clams are subjected to the action of a very high velocity water stream passing through a venturi mechanism at right angles to the axis of the clam induction or infeed tube. The Marvin patent specifies that the high velocity fluid stream generates forces sufficient to shear the bellies from whole clams within the fluid shearing zone. The separated bellies and clam meat are then delivered at high velocity into a collection tank and from this tank are delivered onto a separating conveyor. While the Marvin patent purports to be an improvement on the impact clam extractor of Carlson in terms of lessening structural damage to the clam meat, it is believed that in practice the fluid shearing method of Marvin causes as much or more damage to the meat as the Carlson process. The Marvin patent, for example, specifies shearing fluid velocities in the range of 10,000–20,000 feet per minute at a pressure of 124 psi. While the Marvin method undoubtedly is effective in separating the bellies from the remainder of the clam meat, it is clear that the fluid velocities involved at the shearing zone are sufficient to badly damage the meat and rob it of its desirable firmness.

In light of the above, it is the object of this invention to improve on the prior art in general and on the Marvin method of belly extraction in particular by provision of an extraction method and apparatus which is much gentler in relation to the delicate clam meat and equally or more effective in cleanly separating bellies from the meat compared to Marvin or any other known prior art.

The improved results obtained through the invention are due to the utilization of fluid in the process at a greatly reduced velocity compared to Marvin where it impinges on the clams and the direction of the flushing fluid in two converging streams slightly downstream from the clam delivery pipe or tube, whereby the two fluid streams exert a firm but gentle squeezing force on the clams while flushing them through a pipe toward a decelerating head at the far end of the flush pipe where the clam meat is gently decelerated and directed onto a separating means where the meat and bellies can be separately collected. The use of a reduced velocity fluid stream in the method is enabled by employing a delivery tube for the whole clams upstream from the primary suction chamber which contains a plurality of bulbous zones or sections intervened by constrictions. In passing through this delivery tube under the influence of suction, the clams are subjected to multiple squeezing and multiple abrupt velocity changes which progressively loosens the bellies from the meat and eventually separates the bellies from the meat without any noticeable damage to the meat in terms of loss of firmness and weight. When the clams exit the delivery tube, the bellies are essentially separated from the undamaged meat and the total product is propelled through the flush tube by the flat converging fluid streams generated by nozzles preferably disposed slightly downstream from the exit end of the bulbous delivery tube. The converging streams trap each clam and exert a further squeezing force thereon within the flushing pipe and should there be any incompletely separated bellies when the clams exit the delivery tube, the extracting or separating process is completed within the flushing tube.

BRIEF DESCRIPTION OF THE DRAWINGS

FIG. 1 is a partly schematic elevational view of apparatus employed in the method of extracting bellies from clams in accordance with the present invention.

FIG. 2 is an enlarged fragmentary elevational view showing the arrangement of a pair of convergent axis nozzles and associated elements.

FIG. 3 is an enlarged fragmentary cross section taken through a delivery pipe or tube.

FIG. 4 is an enlarged cross sectional view showing a nozzle aperture of flattened configuration.

DETAILED DESCRIPTION

Referring to the drawings in detail wherein like numerals designate like parts, the apparatus employed in the practice of the method is shown schematically in its entirety in FIG. 1. As shown in this figure, shucked whole clams 10 are delivered by a conveyor 11 to an intake hopper 12 having a bottom outlet pipe 13 extending horizontally therefrom. The outlet pipe 13 is connected by an elbow 14 to a rising elongated vertical delivery tube 15 which forms a very important element of the invention. The delivery tube 15 contains a multiplicity of coaxial equally sized and equidistantly spaced bulbous portions 16 intervened by a corresponding number of narrow throats or constrictions 17 having equal diameters and being equidistantly spaced axially.

When surf clams of the larger type or equivalent mollusks are being processed, the diameter of each bulbous portion 16 internally is approximately two inches and the diameter of each constriction 17 is one and one-half inches. When quahog clams are being processed in the invention, the internal diameter of each bulbous portion 16 is one and one-half inches and the diameter of each constriction 17 is approximately one inch. With these dimensions, during the practice of the method to be described, whole clams of either type above-mentioned are drawn by vacuum through the delivery tube 15 in single file fashion and are subjected to a rapid repetitive massage or squeezing action along with abrupt acceleration and deceleration to loosen the bellies progressively from the clams as they travel through the bulbous delivery tube 15.

At the top of the tube 15, a main vacuum chamber 18 is joined to the delivery tube in open communication therewith and is arranged coaxially with a horizontal flush pipe 19 through which the separated clam meat and bellies are propelled by a water stream toward a decelerator 20. The flush pipe 19 is preferably perpendicular to the axis of the delivery tube 15.

The decelerator 20 is joined to the downstream end of the flush pipe 19 and is flared to increase gradually in cross section from the size of the pipe 19 to a large preferably rectangular product discharge end 21 which is reversely directed relative to the pipe 19. In addition to being flared and gradually changing in cross section from a circular shape equal to the size of the pipe 19 to a much larger cross section rectangular shape, the decelerator 20 has its walls gently curved at 22 to effect reversal of the direction of travel of the separated clams and clam bellies while gradually decreasing their velocities in a very gentle manner without impact, tearing or excessive squeezing.

The decelerated product, upon leaving the discharge end 21, falls gently onto a separating conveyor 23 beneath which is located a first collection tank 24 for clam bellies and a downstream second collection tank 25 for the remainder of the clam meat having the bellies extracted therefrom.

The apparatus additionally comprises a suitable water pump 26 delivering water at a required pressure through a pipe 27 and through branch lines 28 to a pair of equal size convergent jet nozzles 29 whose nozzle tips are slightly downstream from the exit end of the bulbous delivery pipe 15 and within the downstream portion of the vacuum chamber 18.

The dual jet nozzles 29 are important components of the invention and serve several important purposes in the method. The jet streams of water discharging from the nozzles 29 maintain a necessary degree of vacuum in the chamber 18 to elevate the whole clams 10 through the bulbous delivery tube 15 at a proper rate. The nozzle streams also flush and propel the product through the pipe 19 to the decelerator 20 and in so doing complete the separation of any bellies which might remain partly attached to the clams. In practice, however, the bellies are substantially fully extracted from the clams when they reach the vacuum chamber 18 at the discharge end of the bulbous pipe 15.

As shown in FIG. 4, each convergent nozzle 29 preferably has an elongated aperture or slit 30 to produce a flattened ribbon-like jet stream 31. The two convergent flattened streams 31, FIG. 2, draw each clam between them by suction and in so doing exert a further firm squeezing force on opposite sides of each clam as the clam is driven forwardly into the flush pipe 19. This additional squeezing or massage action also helps in completing the extraction of any bellies which may remain attached to clams beyond the discharge end of the bulbous massaging tube 15. Thus, there are three zones in the process where the extraction of clam bellies is gently caused to take place without tearing or impact or other damaging forces. The first and primary zone of extraction is within the tube 15. The second zone is where the product passes between the convergent nozzle streams 31 for further squeezing and propulsion, and the third and final zone is within the flush pipe 19 downstream from the nozzles 29.

In a best embodiment of the invention, water is delivered by the pump 26 to the dual nozzles 29 at a pressure of approximately 65 psi. The nozzle apertures 30 are each the equivalent of a $\frac{3}{8}$th inch diameter aperture. This results in a vacuum within the chamber 18 of approximately $27\frac{1}{4}$ inches of mercury. The velocity of the two fluid streams 31 coming from the converging nozzles 29 near the mouth of the flush pipe 19 is approximately 5898 feet per minute. This velocity is far below the optimum velocity of 12,564 feet per minute set forth in the above-referenced Marvin U.S. Pat. No. 4,148,112. This greatly decreased fluid velocity in the invention is the key to successfully separating the clam bellies from the whole clams in commercial quantities without significant damage to the usable clam meat, and this feature of the invention is the very essence of the advance over the known prior art. With the described optimum nozzle pressure, aperture size, vacuum and fluid velocity, approximately 2500 pounds per hour of shucked whole clams can be de-bellied with the resulting meat in excellent condition, firm and with full weight.

While the above optimum figures are very desirable, they are not extremely critical and the process can be carried out through a fairly wide range of pressures and vacuums in the chamber 18. This working range is from approximately 40 psi fluid pressure at the nozzles 29 to approximately 100 psi with 65 psi being the optimum pressure, as stated. Between 40 psi and 100 psi pressure, the vacuum in the chamber 18 will increase very gradually from about 24 inches of mercury to 28 inches at the maximum nozzle pressure. The entire vacuum range in the chamber 18 is adequate to draw the clams into and through the bulbous delivery tube 15. Correspondingly, in the nozzle pressure range from 40-100 psi, the fluid velocity of the streams 31 will increase gradually from approximately 4600 feet per minute to 7000 feet per minute, the entire velocity range being far below that of the prior art as exemplified by the Marvin patent.

In summation, shucked whole clams are drawn by suction in the chamber 18 from the hopper 12 through the massage or squeeze conduit 15 in single file procession. At each constriction 17, the clams are individually squeezed or compressed around their entire bodies, the constrictions 17 being circular. The soft clams are held up momentarily at each constriction and are then released to burst through the constriction abruptly and to enter the next bulbous portion 16 where each clam abruptly decelerates. This action is repeated a number of times throughout the length of the tube or conduit 15 with substantial rapidity, with the result that the bellies of almost all of the clams are cleanly separated from the clam meat by the time each clam is discharged from the tube 15 into the vacuum chamber 18. As described, a final squeezing of each clam is effected as it passes between the nozzle streams 31 and into the flush pipe 19 to the gentle decelerator 20. The entire process takes place on a continuous basis at fully acceptable production rates and without the damage to the meat which is prevalent in the prior art.

While the length of the delivery tube 15 and the number of bulbs and constrictions in it may vary under the invention, it is preferred that the tube 15 be approximately six feet long and contain approximately fifteen constrictions and bulbs.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method of extracting bellies from marine mollusks with minimized damage to the resulting usable mollusk meat comprising subjecting shucked whole mollusks to a repetitive squeezing and sudden release massage action for a sufficient time and along a sufficient distance of travel of the mollusks to extract the bellies from the mollusks, flushing the separated mollusk meat and bellies along a path toward a separation and collection station for the bellies and said meat, and utilizing vacuum induced by said flushing to propel the shucked mollusks along a path of movement where they are subjected to said repetitive squeezing and sudden release massage action.

2. The method of claim 1, and the additional step of gently decelerating the separated mollusk meat and bellies near the end of said path leading to said separation and collection station.

3. The method of claim 1, and the additional step of subjecting each mollusk to an additional squeezing force between at least two converging streams of fluid near the beginning of the flushing path and following said repetitive massage action.

4. The method of claim 1, and confining the shucked mollusks during the repetitive squeezing and sudden release massage action so that the mollusks are forced to travel in a single file procession during the massage action.

5. The method of claim 1, and accomplishing said repetitive squeezing and sudden release massage action by propelling the shucked mollusks through an elongated conduit having multiple alternating coaxial constrictions and bulbous portions.

6. The method of claim 2, and said decelerating comprising propelling the mollusk meat and bellies through a curved restraining conduit of gradually increasing cross section.

7. The method of claim 1, and said flushing and induced vacuum being accomplished by directing a jet stream of fluid along the flushing path and across the path of travel of the mollusks where they are subjected to said massage action, said jet stream of fluid having a linear velocity not substantially in excess of 6000 feet per minute.

8. The method of claim 7, wherein said induced vacuum is in the range of 26–28 inches of mercury.

9. The method of claim 1, and separately collecting said bellies and mollusk meat at said station.

10. An apparatus for extracting the bellies of marine mollusks from the meat of whole shucked mollusks comprising a vacuum chamber, means to deliver a jet stream of pressurized fluid to the vacuum chamber to induce a partial vacuum therein and to form a flushing fluid stream beyond the vacuum chamber, a flushing conduit extending from the vacuum chamber in one direction and receiving the flushing fluid stream, a decelerator for said stream and separated bellies and mollusk meat entrained therein at the downstream end of said flushing conduit, a delivery conduit for whole shucked mollusks connected into said vacuum chamber and having multiple alternating bulbous portions and constrictions through which the whole mollusks are drawn by vacuum and are subjected to a rapid repetitive massage action prior to entering said fluid stream and conduit.

11. The apparatus as defined in claim 10, and said means comprising a pair of convergent nozzles near the upstream end of said flushing conduit and slightly downstream from the exit end of the delivery conduit, and fluid pumping means coupled with said nozzles.

12. The apparatus as defined in claim 11, and the convergent nozzles having parallel elongated apertures to produce a pair of flat convergent streams through which the mollusks when passing are subjected to a squeezing force.

13. The apparatus as defined in claim 10, and said decelerator comprising a terminal portion on the flushing conduit of gradually increasing cross section.

14. The apparatus as defined in claim 13, and said terminal portion of gradually increasing cross section being curved so that the exit of the terminal portion is substantially reversed in relation to the downstream flow path through the flushing conduit.

15. The apparatus as defined in claim 14, and separating means for the extracted bellies and meat near the exit of said decelerator.

16. The apparatus as defined in claim 10, and infeed hopper means for whole shucked mollusks coupled with said delivery conduit.

17. The apparatus as defined in claim 10, and said constrictions of the delivery conduit being sized to cause the whole shucked mollusks to pass through the delivery conduit in a single file procession with pulsation.

* * * * *